L. A. DISBROW.
DRIVING MEANS FOR CHURNS.
APPLICATION FILED AUG. 28, 1913.
1,147,006.
Patented July 20, 1915.
2 SHEETS—SHEET 1.
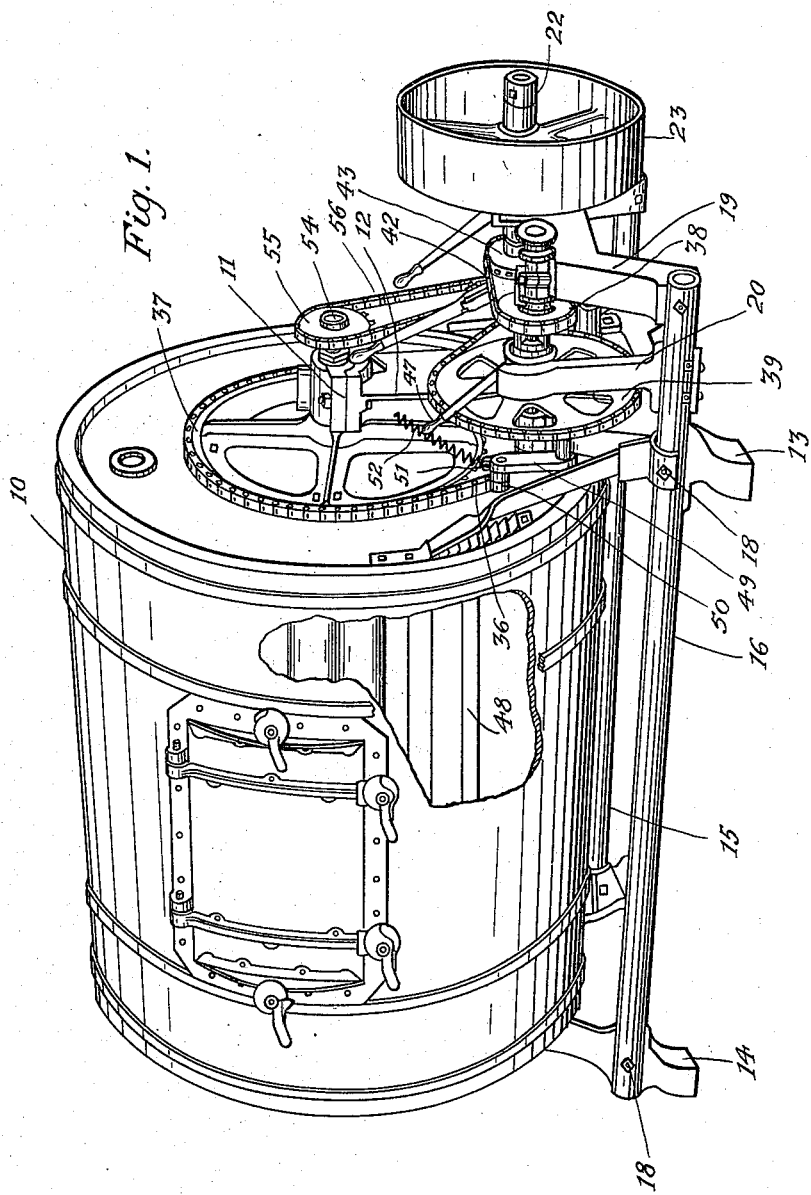
Witnesses:
Thos. Lageard
Robert W. Muir
Inventor:
Levi A. Disbrow.
By ........
his Attorney

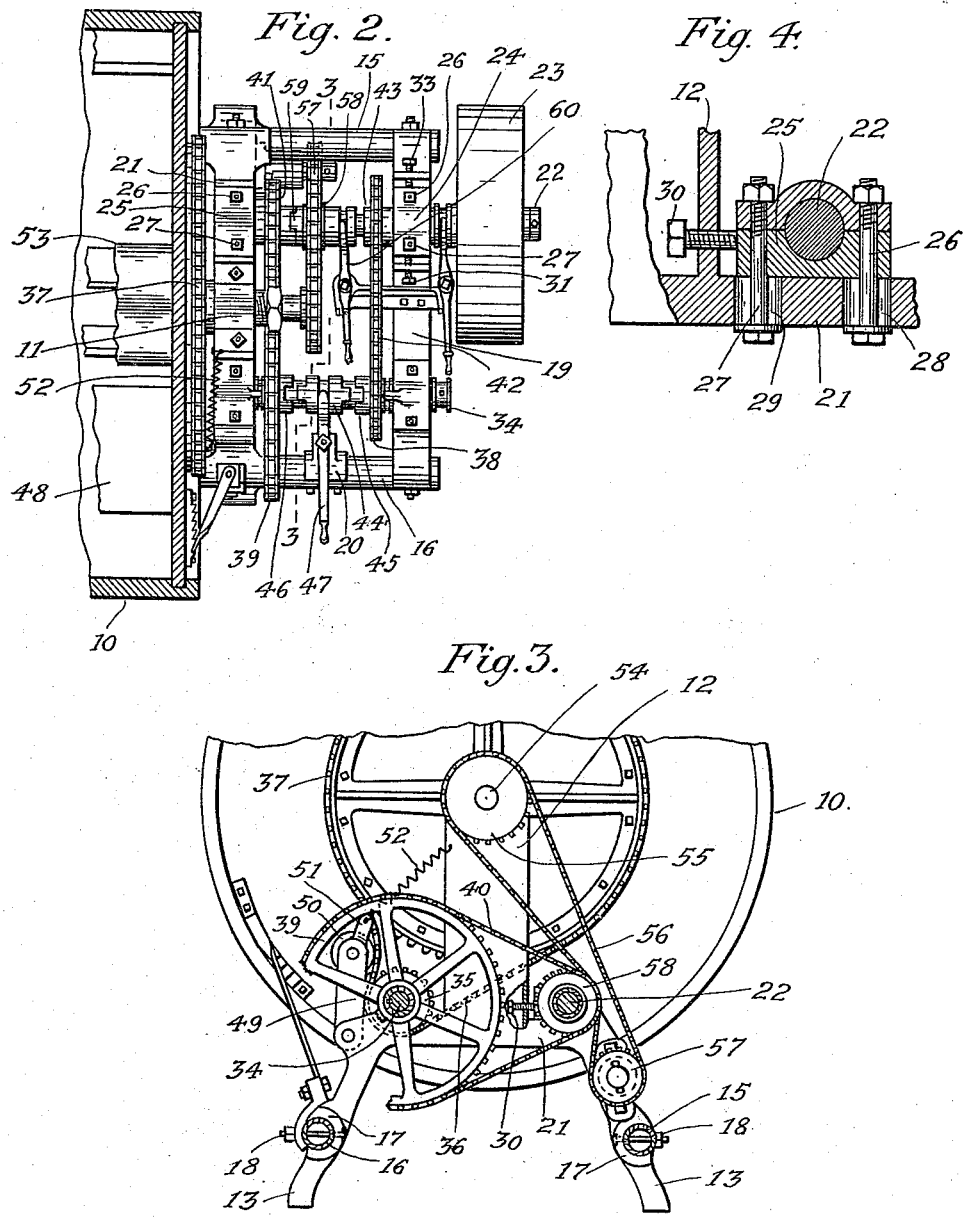

UNITED STATES PATENT OFFICE.

LEVI A. DISBROW, OF OWATONNA, MINNESOTA.

DRIVING MEANS FOR CHURNS.

1,147,006.  Specification of Letters Patent.  Patented July 20, 1915.

Application filed August 28, 1913. Serial No. 787,112.

*To all whom it may concern:*

Be it known that I, LEVI A. DISBROW, a citizen of the United States, residing at Owatonna, in the county of Steele and State of Minnesota, have invented certain new and useful Improvements in Driving Means for Churns, of which the following is a specification.

My invention relates to the driving means for churns, and has for its object to provide a simple and efficient transmission which shall be positive in action and shall provide means for rotating the churn drum at a plurality of speeds and for rotating the central roller therein in opposite direction to that of the drum.

My invention further provides means for properly tightening the sprocket chains used in the transmission and for taking up slack of the main driving sprocket chain and preventing back-lash, together with an improved frame structure.

The full objects and advantages of my invention will appear in connection with the detailed description thereof and are particularly pointed out in the claims.

In the drawings, illustrating the application of my invention in one form, Figure 1 is a prospective elevation of a churn embodying my improvements having a portion of the wall broken away to show the parts inside. Fig. 2 is an enlarged plan view of the transmission end of the machine. Fig. 3 is a sectional end elevation on line 3—3 of Fig. 2 with some parts broken away. Fig. 4 is a detail view of one of the boxes.

As illustrated, the churn proper comprises a cylindrical drum 10 carried by trunnions journaled in bearings 11 formed in standards 12. The standards 12 are supported by sets of legs 13 and 14 which are cast integrally with or otherwise united to the said standards. The corresponding pairs of legs 13 and 14 are rigid in spaced relation to each other and have longitudinal frame members 15 and 16 which will preferably be cylindrical and may if desired be made tubular. Expanded sockets 17 are provided in the sides of leg members 13 and 14 in which the longitudinal members 15 and 16 are seated, said members being secured to the legs in said sockets by bolts 18.

Each of members 15 and 16 has a portion extending forwardly of the legs 13 to which is secured an arched bracket 19. An upright standard or bracket 20 is secured to member 16. Journaled in bearings 24 and 25 on the bracket 19 and a table portion 21 connecting legs 13 with standard 12 is a main drive shaft 22, which shaft has thereon a pulley 23 to be driven from any desired source of power. As clearly shown in Figs. 2 and 4, the bearings 24 and 25 are adjustably mounted, being secured to bracket 19 and the shelf 21, respectively, by means of bolts 26 and 27 which extend through the bearing boxes and through slots 28 and 29 in said shelf 21 and bracket 19. The bearing box 25 is adapted to be adjustably positioned by means of a set bolt 30 which is threaded through a web of standard 12 while bearing box 24 is correspondingly adjusted by means of a set bolt 31 extending through a web on bracket 19. These set bolts are at the back of the bearing boxes so as to receive the force of the pull upon the shaft through the sprocket chains of the transmission. The outside box 24 is provided with an additional set bolt 33 for steadying the box against the forward strain coming from the pulley 23. By means of these set bolts the entire shaft 22 and the parts carried thereby may be adjusted bodily the desired extent thereby tightening the various sprocket chains which run over the shaft and which will be hereafter described. The churn proper is driven from a countershaft 34 journaled in bearings on bracket 19 and shelf 21 parallel with drive shaft 22. Countershaft 34 has fast thereon a sprocket wheel 35 from which runs a sprocket chain 36 to a large sprocket wheel 37 on the end of drum 10. Loose on shaft 34 are two sprocket wheels 38 and 39, respectively, of unequal sizes. The larger sprocket wheel 39 is connected by means of a sprocket chain 40 with a sprocket wheel 41 fast on drive shaft 22, and sprocket wheel 38 is connected by sprocket chain 42 with a sprocket wheel 43 fast on shaft 22. The sprocket wheels 41 and 43 may be of the same diameter. It will be apparent therefore that sprocket wheels 38 and 39 on countershaft 34 will be constantly driven, and, due to their different sizes, at different speeds.

As best shown in Figs. 1 and 2, a double faced clutch 44 is splined on countershaft 34, one face of said clutch being adapted to engage with a clutch face 45 on the hub of sprocket 38 while the other face of clutch 44 is adapted to engage a clutch face 46 on the hub of sprocket 39. The clutch 44 is controlled by a clutch lever 47 pivoted to stand 20. When clutch 44 is engaged with clutch face 45 the machine will be driven at high speed. When the engagement of clutch 44 is with clutch face 46 the churn will be driven at relatively low speed. When the clutch 44 is in neutral position between the clutch faces 45 and 46 the drum will be stationary. The drive in each case is through the sprocket chain 36 and over the sprocket wheel 37. As illustrated in Figs. 1 and 2, the churn is provided at one side thereof with a shelf 48, and in practice while churning a very large weight of thick cream will be lifted on this shelf and carried to near the top of the churn from which it will fall to a point at one side of the bottom of the churn. This results in a tendency on the part of the churn to give and take slack on the driving chain 36 first in one run and then in the other, resulting in a sudden swaying movement of the churn which is known as back-lash, such a back-lash is very injurious and rapidly wears out the driving sprockets and chains and in other ways injures the churn. To prevent this back-lash I have provided a yielding chain tightener. An arm 49 is pivoted to one of legs 13 and has thereon a pulley 50 engageable with the belt 36, as clearly shown in Figs. 1 and 3. The arm 49 has thereon a projection 51 which has connected thereto a spring 52, the spring 52 extending between said projection 51 and the upper part of standard 12. The spring 52 will be sufficiently powerful normally to cause the pulley 50 to engage and take up the slack in the sprocket chain 56. This chain, however, will yield sufficiently when the heavy weight of butter has transferred from one side to the other of the churn, so that the driving efficiency of the sprocket chain is at all times maintained.

My chain is provided with a central roller 53 having its trunnions journaled in bearings within the trunnions of the churn proper. One of the trunnions 54 of said roller extends outside of its bearing and has thereon a sprocket wheel 55. Over the sprocket wheel 55 runs a sprocket chain 56 which sprocket chain runs over an idler sprocket 57 adjustably mounted upon one of the legs 13. A sprocket wheel 58 is loose on shaft 22 and has the hub thereof provided with a clutch face 59 adapted to engage within a complimental clutch face on the hub of the sprocket 41 fast on shaft 22. The sprocket 58 is controlled by clutch lever 60. As shown in Fig. 3, the sprocket 58 engages within one run of sprocket chain 56. When the same is slid along shaft 22 so as to bring the clutch 59 into inoperative position said run of chain 56 will be displaced somewhat sidewise, but under such conditions the chain will be stationary. When the clutch is moved in the operative position the engaged run of the chain will be held in proper alinement with the other run and the chain will be driven, so as to rotate sprocket wheel 55 and roller 53 in a direction opposite to that in which the churn drum is being rotated.

The simplicity and efficiency of my transmission and driving mechanism will be apparent. All parts are exposed so as to be readily available for lubrication, cleaning or repair. Easily accessible means are provided for adjusting the parts so as to tighten the belts, and the resilient belt tightening device applied to the driving chain of the churn constantly keeps said chain tight and prevents back-lash. The double speed drive for the churn is very desirable and under perfect control, and the central roller is adapted to be held stationary or driven reversely to the drum, as desired.

I claim:

1. A rotary churn comprising a cylindrical drum having a shelf on one side of the drum for receiving and lifting the butter, driving means for the drum including a sprocket wheel on the drum and a sprocket chain running over said wheel and operating to sustain the load upon said shelf as it is being lifted, and spring-controlled means engaging the draft run of said sprocket chain at a point removed from the point of last contact of the chain with the sprocket wheel to hold the chain constantly tight and prevent backlash of the churn when the lifted butter is discharged from the shelf.

2. A rotary churn comprising a cylindrical drum having a shelf on one side of the drum for receiving and lifting the butter, a sprocket wheel rigidly secured to the end of the drum, driving means including a sprocket chain running over said sprocket wheel and operating directly to drive the drum and sustain the load upon said shelf as it is being lifted, a pivoted arm having a roller adapted to engage the draft run of the sprocket chain at a point removed from the point of last contact of the chain with the sprocket wheel, and a strong spring connected with said arm and holding said roller in yielding engagement with the sprocket chain to hold the same constantly tight and prevent backlash of the churn when the lifted butter is discharged from the shelf.

In testimony whereof I affix my signature in presence of two witnesses.

LEVI A. DISBROW.

Witnesses:
HARLAN E. LEACH,
MAY CRICKMORE.